US012298995B1

(12) United States Patent
Möller et al.

(10) Patent No.: US 12,298,995 B1
(45) Date of Patent: May 13, 2025

(54) SYSTEMS, METHODS, AND COMPUTER-READABLE MEDIA FOR MANAGING AN EXTRACT, TRANSFORM, AND LOAD PROCESS

(71) Applicant: Nom Nom AI Inc., Vancouver (CA)

(72) Inventors: Justus Reinhold Petter Möller, Dubai (AE); Nikolaos Kontogiannis, Vancouver (CA)

(73) Assignee: NOM NOM AI INC., Vancouver (CA)

( * ) Notice: Subject to any disclaimer, the term of this patent is extended or adjusted under 35 U.S.C. 154(b) by 0 days.

(21) Appl. No.: 18/583,653

(22) Filed: Feb. 21, 2024

(51) Int. Cl.
*G06F 17/00* (2019.01)
*G06F 16/25* (2019.01)

(52) U.S. Cl.
CPC ................... *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 8,423,502 B1* | 4/2013 | Degany | ..................... | G06F 8/65 707/602 |
| 9,910,903 B1* | 3/2018 | Jilani | ..................... | G06F 16/254 |
| 10,963,479 B1* | 3/2021 | Shah | ..................... | G06F 16/254 |
| 11,550,760 B1* | 1/2023 | Manukonda | ........ | G06F 16/2358 |
| 2007/0239636 A1* | 10/2007 | Tang | ........................ | G06N 7/01 706/20 |
| 2008/0168082 A1* | 7/2008 | Jin | ............................ | G06F 8/20 707/999.102 |
| 2009/0240663 A1* | 9/2009 | Plattner | .................... | G06F 16/27 |
| 2009/0276449 A1* | 11/2009 | Syed | ..................... | G06F 16/2453 |
| 2011/0047525 A1* | 2/2011 | Castellanos | ........... | G06F 16/283 718/103 |
| 2011/0055147 A1* | 3/2011 | Joerg | ..................... | G06F 9/4843 707/602 |
| 2011/0125705 A1* | 5/2011 | Aski | ..................... | G06F 16/254 707/E17.022 |
| 2012/0102007 A1* | 4/2012 | Ramasubramanian | ...................... | G06F 16/254 707/705 |
| 2012/0324387 A1* | 12/2012 | Rausch | ................. | G06F 16/254 715/771 |
| 2014/0089252 A1* | 3/2014 | Bhide | ................... | G06F 16/254 707/602 |
| 2015/0046389 A1* | 2/2015 | Dhayapule | ............ | G06F 16/245 707/602 |
| 2015/0100542 A1* | 4/2015 | Li | ........................ | G06F 16/254 707/602 |
| 2015/0347261 A1* | 12/2015 | Li | ....................... | G06F 11/3452 707/602 |
| 2016/0019132 A1* | 1/2016 | Vilakkumadathil | ........................ | G06F 11/3612 717/126 |

(Continued)

*Primary Examiner* — Hung D Le
(74) *Attorney, Agent, or Firm* — Smart & Biggar LP (57) ABSTRACT

Systems and methods for managing a business intelligence database are described, for example, by receiving ETL event data associated with an execution of a set of tasks of the ETL process; processing the ETL event data to identify at least one of a resource and a first task limiting performance of the ETL process, wherein the resource is memory, storage, processor bandwidth, or network bandwidth; and automatically modifying the at least one of the resource and the first task to improve performance of the ETL process.

19 Claims, 8 Drawing Sheets

(56) References Cited

U.S. PATENT DOCUMENTS

| | | | | |
|---|---|---|---|---|
| 2016/0314176 | A1* | 10/2016 | Dhayapule | H04L 47/125 |
| 2017/0060969 | A1* | 3/2017 | Dhayapule | G06F 16/254 |
| 2017/0068595 | A1* | 3/2017 | Nautiyal | G06F 16/254 |
| 2017/0104627 | A1* | 4/2017 | Bender | H04L 47/765 |
| 2018/0150529 | A1* | 5/2018 | McPherson | G06F 9/542 |
| 2019/0258736 | A1* | 8/2019 | Ocher | G06F 16/258 |
| 2019/0318272 | A1* | 10/2019 | Sassin | G06N 20/00 |
| 2020/0004863 | A1* | 1/2020 | Kumar | G06N 7/01 |
| 2021/0090745 | A1* | 3/2021 | Leavitt | G06F 16/254 |
| 2021/0263944 | A1* | 8/2021 | Bodziony | G06F 16/2358 |
| 2021/0294813 | A1* | 9/2021 | Knecht | G06F 16/252 |
| 2022/0129474 | A1* | 4/2022 | Maduri | G06F 16/24554 |
| 2022/0222266 | A1* | 7/2022 | Makumbi | G06F 21/31 |
| 2022/0261413 | A1* | 8/2022 | Jones | G06N 20/00 |
| 2022/0279049 | A1* | 9/2022 | McPherson | H04L 67/34 |
| 2022/0350704 | A1* | 11/2022 | Ehsan | G06F 16/254 |
| 2022/0350813 | A1* | 11/2022 | Ticehurst | G06F 16/254 |
| 2022/0374442 | A1* | 11/2022 | Kaspa | G06N 5/04 |
| 2023/0052612 | A1* | 2/2023 | Stoehr | G06F 9/542 |
| 2023/0065214 | A1* | 3/2023 | Park | G06F 16/254 |
| 2023/0104101 | A1* | 4/2023 | Rodriguez | G06F 9/44521 707/602 |
| 2023/0244475 | A1* | 8/2023 | Holowaty | G06F 8/20 717/121 |
| 2024/0071607 | A1* | 2/2024 | Li | G06F 16/254 |

\* cited by examiner

SYSTEMS, METHODS, AND COMPUTER-READABLE MEDIA FOR MANAGING AN EXTRACT, TRANSFORM, AND LOAD PROCESS

FIELD

The present disclosure relates to data processing systems, and more particularly, to systems and methods for data management using extract, transform and load processes, for example, for managing an extract, transform, and load (ETL) process.

BACKGROUND

An ETL process is commonly used to combine data from multiple sources, into a central database or repository, where it can be easily accessed for analysis. In the "extract" phase of an ETL process, data is retrieved from one or more data sources. Commonly, the data gathered from various sources exists in formats that are different than what is needed for storage or analysis. In the "transform" phase of an ETL process, the extracted data may be transformed or converted into a format that is compatible with operational requirements. Finally, in the "load" phase of an ETL process, the transformed data may be stored in a data warehouse or another central database, making it available for analysis, reporting or other business intelligence purposes.

The extracting, transforming, and loading phase are broken down into tasks that are performed by workers. These tasks are pre-defined by system architects based on experience. During the design process, the system architects may be unaware of various considerations and limitations that can impact the performance of the ETL process. Such issues can include hardware limitations, such as processor, memory and storage capacity, network limitations, data source limitations, ETL process step limitations, etc. Further, changes in the types and forms of queries can occur after design. All of these issues can lead to mismatches between the designed ETL process and that which best suits the available resources and changing business requirements.

SUMMARY

In a first aspect of the present disclosure, there is provided a computing system for managing an extract, transform and load (ETL) process comprising: one or more processors; and a memory in communication with the one or more processors, the memory storing machine-executable instructions which, when executed by the one or more processors, cause the one or more processors to: receive ETL event data associated with an execution of a set of tasks of the ETL process; process the ETL event data to identify at least one of a resource and a first task limiting performance of the ETL process, wherein the resource is memory, storage, processor bandwidth, or network bandwidth; and automatically modify the at least one of the resource and the first task to improve performance of the ETL process.

In some or all exemplary embodiments of the first aspect, the at least one of the resource and the first task includes at least the resource, and wherein the machine-executable instructions, when executed by the one or more processors, cause the one or more processors to: increase an allocation of the resource to improve the performance of the ETL process.

In some or all exemplary embodiments of the first aspect, the machine-executable instructions, when executed by the one or more processors, cause the one or more processors to: in response to identifying the first task is limiting performance of the ETL process as a result of an error, obtain a database schema and a natural language representation of a user intent associated with the first task; and automatically modify, using a machine learning model, the set of task instructions, based on the database schema and the natural language representation.

In some or all exemplary embodiments of the first aspect, the set of task instructions represent SQL code associated with one or more SQL operations.

In some or all exemplary embodiments of the first aspect, the machine-executable instructions, when executed by the one or more processors, cause the one or more processors to: prior to receiving the ETL event data: receive a natural language description of a requirement of the ETL process; and generate, by a machine learning model, the set of tasks of the ETL process, based on the natural language description.

In some or all exemplary embodiments of the first aspect, the machine-executable instructions, when executed by the one or more processors, cause the one or more processors to: in response to identifying the at least one of the resource and the first task limiting performance of the ETL process, determine whether one or more alerts should be sent; and in response to determining that one or more alerts should be sent, generate the one or more alerts for notifying a user of the first operating condition of the ETL process.

In some or all exemplary embodiments of the first aspect, the one or more alerts is selected from the group consisting of: a system alert; a text alert; an email alert; a phone alert; and a notification channel alert.

In some or all exemplary embodiments of the first aspect, the ETL event data comprises at least one of: an execution log associated with an execution of the first task; and a connection data status for a connection associated with the first task.

In some or all exemplary embodiments of the first aspect, the ETL event data enabling identification of the at least one of the resource and the first task limiting performance of the ETL process comprises at least one of: an error associated with an allocation of the resource that is insufficient to perform the ETL process; an error in a set of task instructions associated with the first task; or a failed connection to a data source associated with the first task.

In some or all exemplary embodiments of the first aspect, the at least one of the resource and the first task includes at least the resource, and wherein the machine-executable instructions, when executed by the one or more processors, cause the one or more processors to: split the first task into two or more subtasks; and dynamically schedule the two or more subtasks as part of the ETL process.

In a second aspect of the present disclosure, there is provided a method for managing an extract, transform and load (ETL) process comprising: receiving ETL event data associated with an execution of a set of tasks of the ETL process; processing the ETL event data to identify at least one of a resource and a first task limiting performance of the ETL process, wherein the resource is memory, storage, processor bandwidth, or network bandwidth; and automatically modifying the at least one of the resource and the first task to improve performance of the ETL process.

In some or all exemplary embodiments of the second aspect, the automatically modifying the at least one of the resource and the first task includes: in response to determining that the first operating condition of the ETL process is associated with an allocation of a first subset of computing resources on the computing system that are insufficient to execute the first task, increase an allocation of the resource to improve the performance of the ETL process.

In some or all exemplary embodiments of the second aspect, the automatically modifying the ETL process comprises: in response to identifying the first task is limiting performance of the ETL process as a result of an error, obtaining a database schema and a natural language representation of a user intent associated with the first task; and automatically modifying, using a machine learning model, the set of task instructions, based on the database schema and the natural language representation.

In some or all exemplary embodiments of the second aspect, the set of task instructions represent SQL code associated with one or more SQL operations.

In some or all exemplary embodiments of the second aspect, the method further comprises: prior to receiving the ETL event data: receiving a natural language description of a requirement of the ETL process; and generating, by a machine learning model, the set of tasks of the ETL process, based on the natural language description.

In some or all exemplary embodiments of the second aspect, the method further comprises: in response to identifying the first operating condition of the ETL process, determining whether one or more alerts should be sent; and in response to determining that one or more alerts should be sent, generating the one or more alerts for notifying a user of the first operating condition of the ETL process.

In some or all exemplary embodiments of the second aspect, the one or more alerts is selected from the group consisting of: a system alert; a text alert; an email alert; a phone alert; and a notification channel alert.

In some or all exemplary embodiments of the second aspect, the ETL event data comprises at least one of: an execution log associated with an execution of the first task; and a connection data status for a connection associated with the first task.

In some or all exemplary embodiments of the second aspect, the ETL event data enabling identification of the at least one of the resource and the first task limiting performance of the ETL process comprises at least one of: an error associated with an allocation of a first subset of computing resources on the computing system that are insufficient to execute the first task; an error in a set of task instructions associated with the first task; and a failed connection to a data source associated with the first task.

In a third aspect of the present disclosure, there is provided a non-transitory computer-readable medium storing machine-executable instructions which, when executed by one or more processors, cause the one or more processors to: receive ETL event data associated with an execution of a set of tasks of the ETL process; process the ETL event data to identify at least one of a resource and a first task limiting performance of the ETL process, wherein the resource is memory, storage, processor bandwidth, or network bandwidth; and automatically modify the at least one of the resource and the first task to improve performance of the ETL process.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

In large-scale ETL operations (e.g., enterprise-level ETL data platforms), the ability to monitor the health and performance of workers and data connections in real time is critical. Enterprises require a robust system to detect, alert, and report on various metrics and events that may impact the data processing flow, ensuring minimal downtime and efficient troubleshooting. For example, problems may occur within ETL pipelines that cause processes to slow down, fail, or exceed available resources. In other examples, ETL pipelines may become targets for data breach, posing a risk of exposure of sensitive data.

Systems and methods are provided for real-time monitoring and management of ETL processes. Examples of the disclosed ETL management platform may improve the performance of ETL systems by proactively monitoring ETL processes, generating recommendations for modifications to ETL workflows and/or hardware configurations for running the ETL workflows, and/or automatically modifying ETL workflows or hardware configurations to overcome detected issues. Examples of the disclosed ETL management platform enable the collection and analysis of logs and health checks from workers in a cloud computing environment during the execution of ETL processes, analyzing this data through a monitoring engine, compiling the analyzed data through an observability engine for historical analysis, and generating instructions for modifying pipelines to overcome errors. An alert unit generates notifications in response to detected issues, and a web-based dashboard outputs system status information in real-time system, enabling a user to take appropriate actions for maintaining or optimizing ETL processes. The disclosed systems and methods may enable rapid response to potential issues within ETL processes, helping to maximize the integrity and efficiency of data processing operations. This provides a technical advantage in reducing the unnecessary consumption of computing resources (e.g., processing power, memory, computing time, etc.) associated with inefficient or erroneous ETL processes.

In various exemplary embodiments, the solution provides a technical benefit of improved automated error handling, for example, during the execution of ETL processes. In response to detecting an error during an ETL process, the proposed solution may automatically alter the hardware configuration employed for running a task of the ETL process, for example, by deploying alternate and/or additional resources for successfully executing the task. In this regard, the solution may seamlessly overcome errors caused by insufficient resources by configuring a cloud computing API to more efficiently or more accurately distribute resources needed for task execution.

In various exemplary embodiments, the solution provides a technical effect of analyzing task code (such as SQL for storing and processing information in a relational database, or other code associated with ETL tasks) for correctness, and modifying tasks (e.g., related to SQL operations) for ensuring the correctness of the task code, based on the analysis. In examples, the execution of incorrect code poses many risks to the accuracy and integrity of stored data. For example, executing incorrect SQL queries may irrevocably destroy data, (e.g., by overwriting data within a database), among other risks.

In various exemplary embodiments, the solution includes the authorization of workers in the cloud computing environment and data encryption for ETL processes. The solution provides a benefit of ensuring that workers are authorized to access data sources and databases, and data remains confidential throughout the process, thereby helping to minimize a risk of data breach, tampering or other risks that compromise the quality and integrity of data. In this regard, the solution may improve the quality and integrity of ETL data by enhancing the preventative and proactive security measures associated with connections to data sources.

In various exemplary embodiments, the solution provides a technical effect of automatically generating SQL code according to data retention or other corporate policies. For example, given a natural language input outlining data retention or other data requirements, the solution may generate SQL code for executing tasks and appropriately documenting such execution, for ensuring compliance with corporate policies or other regulations.

Figure 1:
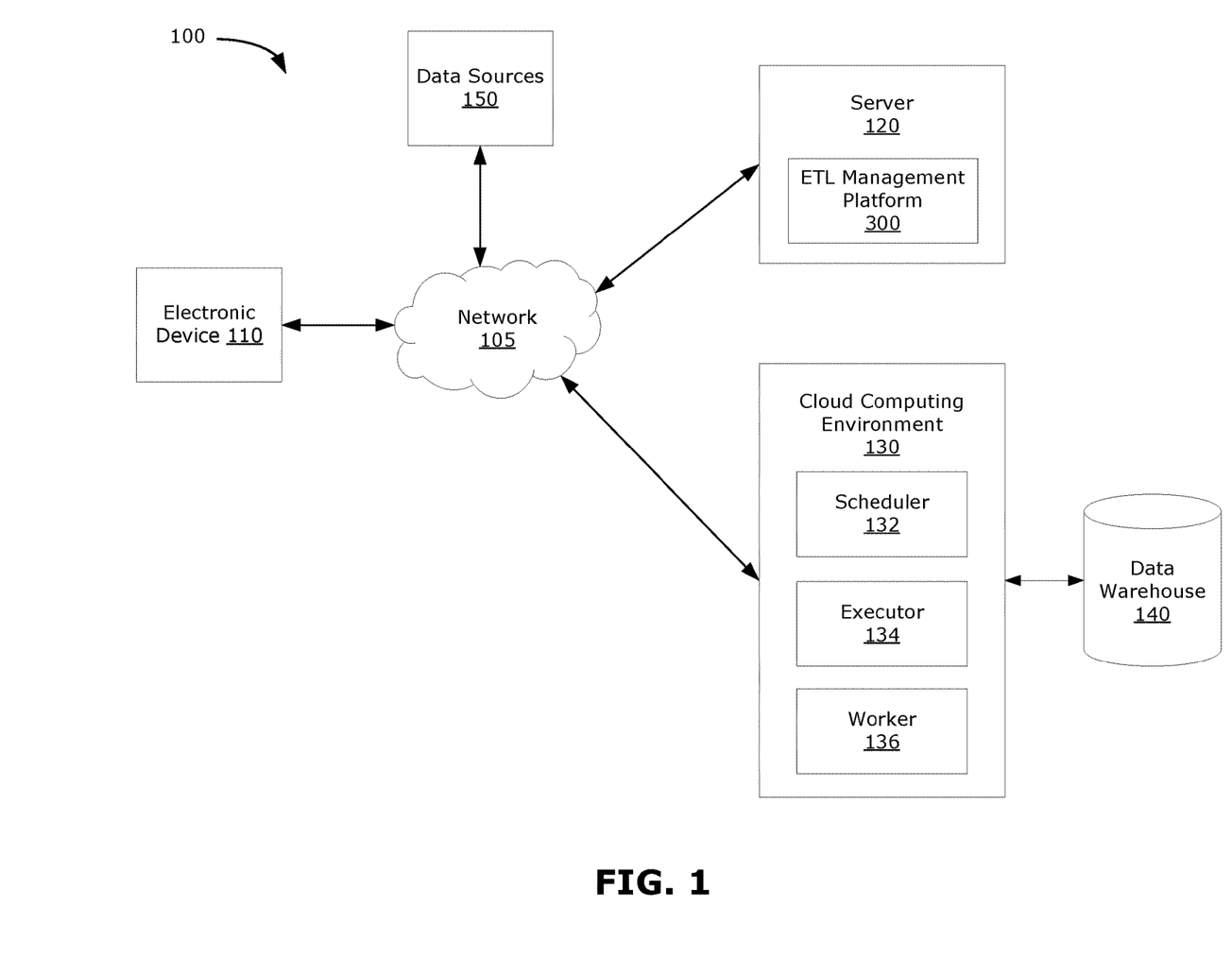
FIG. 1 is a schematic diagram illustrating an exemplary ETL computing system and its operating environment.

FIG. 1 is a block diagram illustrating an example simplified system 100 in which examples of the present disclosure may be implemented. The system 100 has been simplified in this example for ease of understanding; generally, there may be more entities and components in the system 100 than that shown in FIG. 1. The system 100 may be an integrated system for managing execution workflows across a distributed network, for example, for managing a business intelligence database using ETL processes. The system 100 may include a data communications network 105. The data communications network 105 may be any form of data communications network (e.g., an intranet, the Internet, a P2P network, a WAN and/or a LAN). The system 100 may further include one or more electronic devices 110, a server 120, a cloud computing environment 130, a data warehouse 140, and one or more data sources 150.

In examples, a user may interact with the system 100 via an electronic device 110, for example, the electronic device 110 may connect to the network 105 in order to communicate with the server 120 and the cloud computing environment 130 to receive input (e.g., user input) and to cause the electronic device 110 to provide an output, as described herein. The electronic device 110 may include a display (not shown), for example, for providing a user interface (UI) via the display that presents output to a user, for example, enabling the user to monitor the status and performance of ETL processes of the system 100. In examples, the electronic device 110 can be a desktop computer, laptop computer, a mobile communication device, such as a smart phone or a tablet, or any other suitable computing device that can perform the functionality described herein.

In examples, the server 120 may be an ETL system, for example, for managing enterprise-level ETL operations across the network 105, or the server 120 may be configured to cooperate with an external ETL system. In some embodiments, for example, the server 120 may manage various ETL workflows or pipelines, for example, where an ETL pipeline may include a set of tasks that define an ETL process. The server 120 includes an ETL management platform 300, as further described with respect to FIG. 3 below. The term "server", as used herein, is not intended to be limited to a single hardware device: the server 120 may include a server device, a distributed computing system, a virtual machine running on an infrastructure of a datacenter, or infrastructure (e.g., virtual machines) provided as a service by a cloud service provider, among other possibilities. Generally, the server 120 may be implemented using any suitable combination of hardware and software, and may be embodied as a single physical apparatus (e.g., a server device) or as a plurality of physical apparatuses (e.g., multiple machines sharing pooled resources such as in the case of a cloud service provider). The term "resources", as used herein, can refer to hardware or software elements, for example, physical hardware infrastructure or virtual infrastructure. By way of example, resource capacity may be expressed in terms of processing power or bandwidth, memory, storage space, computing time, etc.

In examples, the cloud computing environment 120 may be configured by an ETL system 250 to execute the tasks or processes of an ETL pipeline, for example, to enable the extracting and transforming of source data obtained from data sources 150 into a desired format for loading into the data warehouse 140. In examples, the cloud computing environment 120 may include a combination of hardware and software configured to receive data from, and transmit data to other components of system 100, via the network 105, and to perform functions of the ETL pipeline. In examples, the cloud computing environment 120 may include a scheduler 132 for scheduling the executions of the tasks associated with an ETL pipeline, for example, determining an order and/or timing of various tasks to be executed, an executor 134 for determining what resources will execute the tasks as each task is queued, and a worker 136 for performing the tasks, for example, a node or processor which runs the tasks. In examples, the worker 136 may also be responsible for conducting health checks to verify the integrity and performance of their processes. In exemplary embodiments, tasks can include data extraction tasks (e.g., detecting new information in a data source, querying data, copying data, streaming data, etc.), data formatting, filtering and/or cleansing tasks (e.g., separating data, masking, substituting, hashing or shuffling data, recognizing invalid entries or syntax errors, etc.), data validation tasks (e.g., comparing to a lookup table, validating mappings etc.) or data warehousing tasks (e.g., loading into a target table, etc.), among others.

In examples, the data associated with the data sources 150 may originate from third party servers (for example, hosting external databases or software platforms such as enterprise resource planning (ERP), customer relationship management (CRM), marketing campaigns, transactional computer systems, among others), internal databases or document management systems, or other sources such as applications, sensors, etc., for example, associated with the electronic device 110, among others. In some embodiments, for example, ERP or CRM data may be sourced from programs such as ORACLE™, Salesforce™ Microsoft Excel™, among others and may be include data stored in a relational database management system (RDBMS), a SQL server or as one or more flat files, among other formats.

In examples, data may be obtained from data sources 150 via a connector (not shown), for example, a software component that establishes a connection to the data source 150, depending on the format or type of data source 150. For example, a connector may include a database connector (e.g., for connecting to relational or other databases), a file connector (e.g., for connecting to a file system, such as CSV, JSON and XML), or a web service connector (e.g., for connecting to a web service, such as SOAP or REST). In examples, a connector may also facilitate connection to targets within the data warehouse 140, for example, for storing the extracted and transformed data, among others. In examples, a connector may include authorization methods, such as OAuth, API keys, or tokens, among others, for ensuring a secure connection to a data source 150 and/or data warehouse 140. In this regard, examples of the present disclosure may protect data integrity, improve data quality and enhance preventative and proactive security measures for connections.

In examples, the data warehouse 140 may be a database or a distributed storage or data repository, for example a cloud-based storage or data repository. In examples, the data warehouse 140 may store large volumes of current or historical data required to support business intelligence (BI) activities, for example, for performing queries and analysis. In embodiments, the data warehouse 140 may store data for pre-determined durations, for example, according to data retention or other corporate policies.

Figure 2:
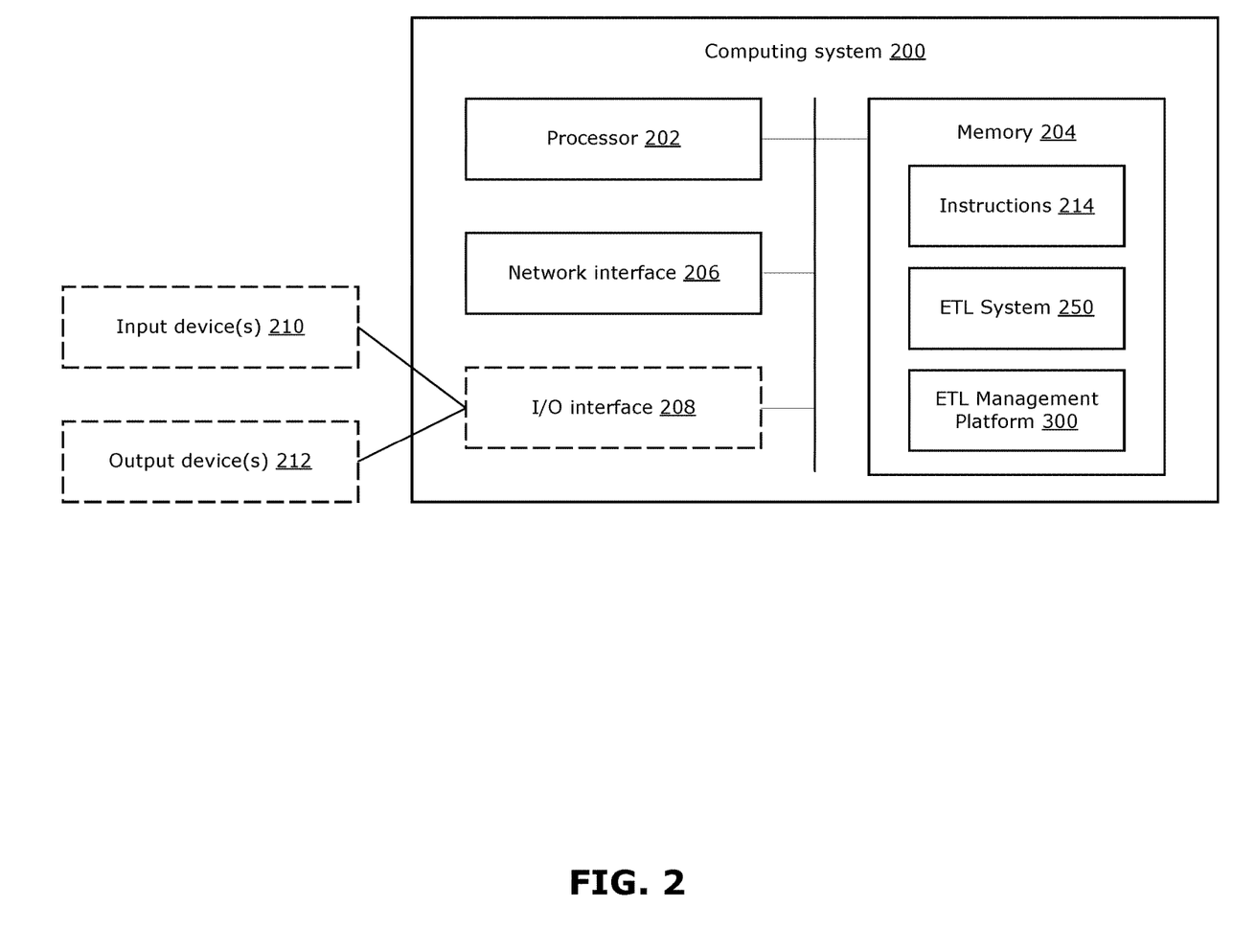
FIG. 2 is a schematic diagram of various physical elements of an exemplary ETL computing system.

FIG. 2 illustrates an example computing system 200, which may be used to implement examples of the present disclosure. For example, the computing system 200 may be used to monitor and/or observe one or more ETL pipelines, or may modify tasks and/or resource allocations associated with tasks, as disclosed herein, such as performed by the server 120 in FIG. 1. In addition, the computing system 200 may be the electronic device 110, part or all of the cloud computing environment 130, the data warehouse 140 and one or more of the data sources 150.

The example computing system 200 includes one or more processing units and memory 204. The one or more processing units (simply referred to as processor 202) may be hardware processors. The processor 202 may be, for example, a central processing unit (CPU), a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 204 may include volatile and/or non-volatile memory (e.g., a flash memory, a random-access memory (RAM), and/or a read-only memory (ROM)). The memory 204 may store machine-executable instructions 214 for execution by the processor 202, to cause the computing system 200 to carry out examples of the methods, functionalities, systems and modules disclosed herein. The memory 204 may include other software instructions, such as for implementing an operating system and other applications/functions.

The computing system 200 may also include at least one network interface 206 (referred to hereinafter as network interface 206 for simplicity) for wired and/or wireless communications with external systems and/or networks (e.g., an intranet, the Internet, a P2P network, a WAN and/or a LAN). The network interface 206 may enable the computing system 200 to carry out communications (e.g., wireless communications) with systems external to the computing system 200.

The computing system 200 may optionally include at least one input/output (I/O) interface 208, which may interface with optional input device(s) 210 and/or optional output device(s) 212. Input device(s) 210 may include, for example, a mouse, a microphone, a touchscreen, a keyboard, etc. Output device(s) 212 may include, for example, a display, a speaker, etc. In this example, optional input device(s) 210 and optional output device(s) 212 are shown external to the computing system 200. In other examples, one or more of the input device(s) 210 and/or output device(s) 212 may be an internal component of the computing system 200.

In the example of FIG. 2, the computing system 200 may store in the memory 204 machine-executable instructions, which may be executed by a processing unit such as the processor 202, to implement one or more embodiments disclosed herein. For example, the memory 204 may store machine-executable instructions for implementing an ETL system 250 or an ETL management platform 300, which may include an authentication engine 310, a monitoring engine 330, a notification engine 340, an observability engine 350 and a user interface (UI) module 360, described with respect to FIG. 3 below.

In some examples, the computing system 200 may be a server of an online platform that provides the ETL management platform 300 as a web-based or cloud-based service that may be accessible by a user device (e.g., via communications over a wireless network). Other such variations may be possible without departing from the subject matter of the present application.

Figure 3:
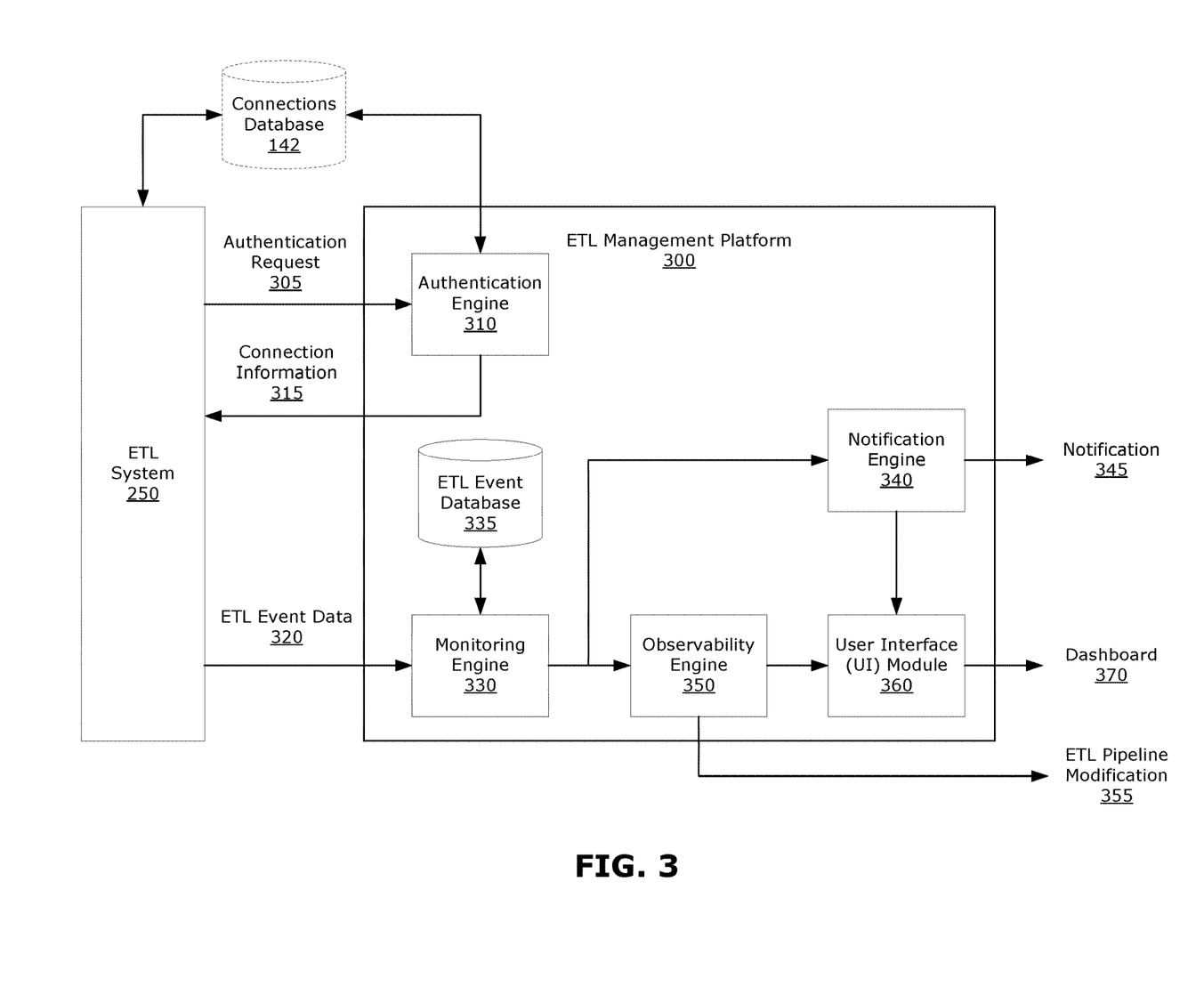
FIG. 3 is a schematic diagram of various components of an exemplary ETL system in accordance with exemplary embodiments of the present disclosure.

FIG. 3 shows a block diagram of an example architecture for the ETL management platform 300, in accordance with examples of the present disclosure. The ETL management platform 300 may be a software that is implemented in the computing system 200 of FIG. 2, in which the processor 202 is configured to execute machine-executable instructions of the ETL management platform 300 stored in the memory 204. The ETL management platform 300 includes an authentication engine 310, a monitoring engine 330, a notification engine 340, an observability engine 350 and a user interface (UI) module 360. The ETL management platform 300 may receive as input, an authentication request 305 and/or ETL event data 320 associated with one or more ETL events, and may generate one or more notifications 345 and/or metrics, such as presented via a dashboard 370 for outputting to an electronic device 110. In addition, the observability engine 350 can affect the ETL modifications 355.

In response to an input received by the server 120, for example, a user input via the electronic device 110 or an input as part of a sequence of tasks in an ETL pipeline, the ETL system 250 may perform a process that requires establishing a connection with another component of system 100; for example, with a data source 150 or the data warehouse 140, among others. In some embodiments, a sequence of tasks associated with an ETL pipeline may be initiated manually, based on a timing schedule or based on the completion of another sequence, among others. A user input may be received, for example, via the user interface generated by the UI module 360, that provides information required to configure a connection with the component. The user input may be received as a textual input, for example, received as a natural language representation via a textbox object in a user interface, or the user input may be received as a selection of an item (e.g., from a menu, a list, etc.) in the user interface. The user input may be an audio input, for example, received as a natural language representation via a microphone of computing system 200, or as a touch input, among other inputs.

The ETL system 250 may search a database (e.g., a connections database 142 or another database stored on the server 120 or in the data warehouse 140) to determine whether a corresponding connection has been previously configured, or whether a new connection requires configuration. In some embodiments, the database may be a MySQL™ database or another database may be used. In some embodiments, when an existing connection is not found, a new connection may be configured, for example, by obtaining a connection configuration information from the user input and storing the information required to establish a connection with the data source 150, for example, in the connections database 142. In examples, connection information may be encrypted and the encrypted connection information may be stored in the connections database 142.

In some embodiments, when an existing connection is found in the connections database 142, or subsequent to the connection being configured, the ETL system 250 may interface with the cloud computing environment 130 to execute an ETL pipeline. In examples, a process for establishing a connection with the component may be scheduled by the scheduler 132, which may cause a worker 136 to request permission from the ETL management platform 300 to proceed with establishing the connection. In examples, the worker 136 may provide an authentication request 305 to the authentication engine 310. In examples, a connection may include authorization methods, such as OAuth, API keys, or tokens, among others, for ensuring a secure connection to a data source 150 and/or data warehouse 140. In examples, the worker 136 may provide information required to authenticate the worker 136, such as a key or token etc. In examples, based on the authentication information provided by the worker 136, the authentication engine 310 may validate the worker authentication and determine whether to grant permission to the worker 136 to execute the task. In response to the authentication engine 310 determining that permission is not granted, the task may terminate immediately. In other examples, in response to the authentication engine 310 determining that permission is granted, the worker 136 may run the task and the authentication engine 310 may obtain the encrypted connection information from the connections database 142 and may decrypt the connection information. In examples, the authentication engine 310 may provide the decrypted connection information to the worker 136 for executing the task. In this regard, the present disclosure may improve the security of the ETL process, by managing and/or restricting connections according to authentication and verification protocols.

In embodiments, when the ETL task is an SQL task, the ETL system 250 may receive an input as a natural language representation and may automatically generate one or more corresponding SQL queries based on the natural language representation. For example, the natural language representation may be a textual input, such as a document, and the ETL management platform 300 may process the document using a natural language processor (NLP) to extract meaning or user intent from the document and may automatically generate one or more tasks for execution within an ETL pipeline, based on the user intent. In an exemplary embodiment, the natural language representation may be a legal document or a corporate policy (e.g., related to data retention or another corporate policy) and the ETL management platform 300 may automatically generate one or more tasks, based on the natural language representation, for example, for implementing the requirements of the legal document or corporate policy and generating appropriate documentation for ensuring compliance. In embodiments, the ETL management platform 300 may directly interface with the cloud computing environment 130 to execute the one or more tasks. In exemplary embodiments, the ETL management platform 300 may automatically update tasks in response to receiving an updated natural language representation, for example, to reflect changes to the regulation or corporate policy, among other changes.

In some embodiments, while the worker 136 is executing the task, the worker 136 may transmit execution logs and/or other status updates (for example, associated with connections established by the worker 136 for executing the task or failed connections, among other tasks), to the monitoring engine 330. In examples, the transmitted logs and/or other status updates or connection data may collectively be referred to as ETL event data 320. In examples, the monitoring engine 330 may process and store ETL event data 320, for example, in an ETL event database 335. In this regard, the ETL management platform 300 may be continuously informed of the execution status by the worker 136. In examples, upon completion of the task, the worker 136 may signal to the monitoring engine 330 that the task has been finished.

In some embodiments, the monitoring engine 330 may process the ETL event data 320 to generate informational data associated with an operating condition or a status of the ETL process, for example, for identifying a sub-optimal hardware configuration for executing the ETL process or errors in an execution log, or for evaluating the status of connections with data sources 150, among others. In examples, the ETL system 250 may extract or transform source data into a desired format for loading into the data warehouse 140, according to a set of ETL rules. In examples, the monitoring engine 330 may process the ETL event data 320 to identify operating conditions of the ETL process causing exceptions to the ETL rules, or the monitoring engine 330 may compare information obtained from the informational data to pre-determined thresholds, or other criteria, for example, for indicating an error in the ETL process (e.g., an exception to an ETL rule, a value exceeding a threshold, a connection status indicating a connection failure, etc.) or for indicating an operating condition of the ETL process that is sub-optimal. In some embodiments, in response to identifying a specific operating condition of the ETL process, such as an error, the monitoring engine 330 may provide information about the observed operating condition to the notification engine 340 for generating a notification 345 to the user. In examples, the notification 345 may include a system alert, a text alert (e.g., a text message or SMS notification), an email alert, a phone alert, an alert delivered to another notification channel, for example, as a Slack™ notification, among others. In some embodiments, other notifications 345 may be configured, for example, to notify a user when a task has been completed, or terminated, among others.

In some embodiments, the informational data may be received by the observability engine 350, for example, for further processing and analysis. While the monitoring engine 330 and the observability engine 350 are shown in FIG. 3 as separate entities, it is understood that the functions performed by the monitoring engine 330 and the observability engine 350 may be performed by a single entity. In examples, the observability engine 350 may compile and store the execution logs and connection health data, or other processed information as historical information, for example, in a database. In examples, the observability engine 350 may compare current execution logs and/or connection health data, as it is received in real-time, to the historical information, for evaluating a real-time status of the ETL system 250.

In an exemplary embodiment, the observability engine 350 may analyze the code associated with each ETL task, for example, using an artificial intelligence (AI)-based analyzer (not shown). For example, the AI-based analyzer may be a machine learning (ML) model or another model that has been trained to recognize a set of task instructions (e.g., SQL code associated with one or more SQL operations, among others) and identify errors in the task instructions. For example, when the ETL task is an SQL task, the AI-based analyzer may receive a database schema and a natural language representation of a user's intent for the task and may evaluate the correctness of the corresponding SQL code associated with the task. In an embodiment, in response to determining an error in the corresponding SQL code, the observability engine 350 may initiate an ETL modification 355, for example, using an AI-based generator (not shown), for automatically modifying the SQL code of the ETL task to address the error. For example, the AI-based generator may be a generative ML model or another model that has been trained to generate a set of instructions (e.g., SQL code associated with one or more SQL operations, among others). In this regard, automatically modifying the SQL code of the ETL task to align with a user's intent may improve system efficiency, while reducing the risks associated with executing incorrect SQL queries (e.g., irrevocably destroying data, among other risks). While the AI-based analyzer and the AI-based generator have been described as separate entities, it is understood that the functions performed by the AI-based analyzer and the AI-based generator may be performed by a single entity.

In an exemplary embodiment, the observability engine 350 may evaluate or analyze various aspects of the ETL pipelines, for example, performance, speed, volume, failure rates, quality indices, among other analytics functions. In some embodiments, the observability engine 350 may instruct a modification (e.g., ETL modification 355) to one or more ETL pipelines running in the ETL system 250. For example, the ETL modification 355 may alter the hardware configuration running a task, (e.g., in the cloud computing environment 130) based on the observed operating condition of the ETL process, for example, to avert a potential error or to overcome an observed error in the ETL pipeline. In this regard, the observability engine 350 may cooperate with the task scheduler 132 to manage resource allocation associated with the execution of ETL pipelines, for example, by interfacing with a cloud computing API and automatically deploying additional and/or alternative resources for executing the task. Accordingly, the solution may efficiently handle errors caused by failures in batch processing data operations (e.g., related to insufficient resources, among others), by allocating other resources, with effect that segmentation faults or failure conditions may be avoided.

In an exemplary embodiment, the ETL modification 355 may instruct the ETL system 250 to modify another task of the ETL process based on the informational data. For example, the observability engine 350 may determine that an ETL process is exceeding available resources (e.g., limitations on memory, among others), causing the process to slow down. For example, the observability engine 350 may diagnose the slow down and determine that an SQL query is pulling too much data and may generate an ETL modification 355 to instruct the ETL system 250 to adjust the ETL process to process the data in batches. In other examples, the ETL modification 355 may instruct the ETL system 250 to adjust the ETL process to change the way queries are built, or to change the frequency at which the database is queried, among other adjustments, to reduce the volume of data that requires processing. In other examples, the observability engine 350 may determine that an ETL process is exposing confidential data in an undesirable way and may the generate an ETL modification 355 to instruct the ETL system 250 to adjust the ETL process to protect the confidential data.

In some embodiments, the informational data and/or any additional data generated by the observability engine 350, may directed to a central, web-based, monitoring and observability dashboard 370, for example, via the UI module 360. In examples, the UI module 360 may also receive information associated with notifications 345 from the notification engine 340, for display in the dashboard 370. In example, the dashboard 370 may provide a representation of the informational data, for example, that presents the compiled data to a user in an accessible format, allowing users to assess the real-time operational status of the ETL platform and to respond promptly to any alerts. In examples, the dashboard 370 may be communicated to an electronic device to cause the electronic device to display the UI module 360, enabling output of the dashboard 370 on a display of the electronic device. Further details about the dashboard 370 are provided with respect to FIGS. 6A-C below.

Figure 4:
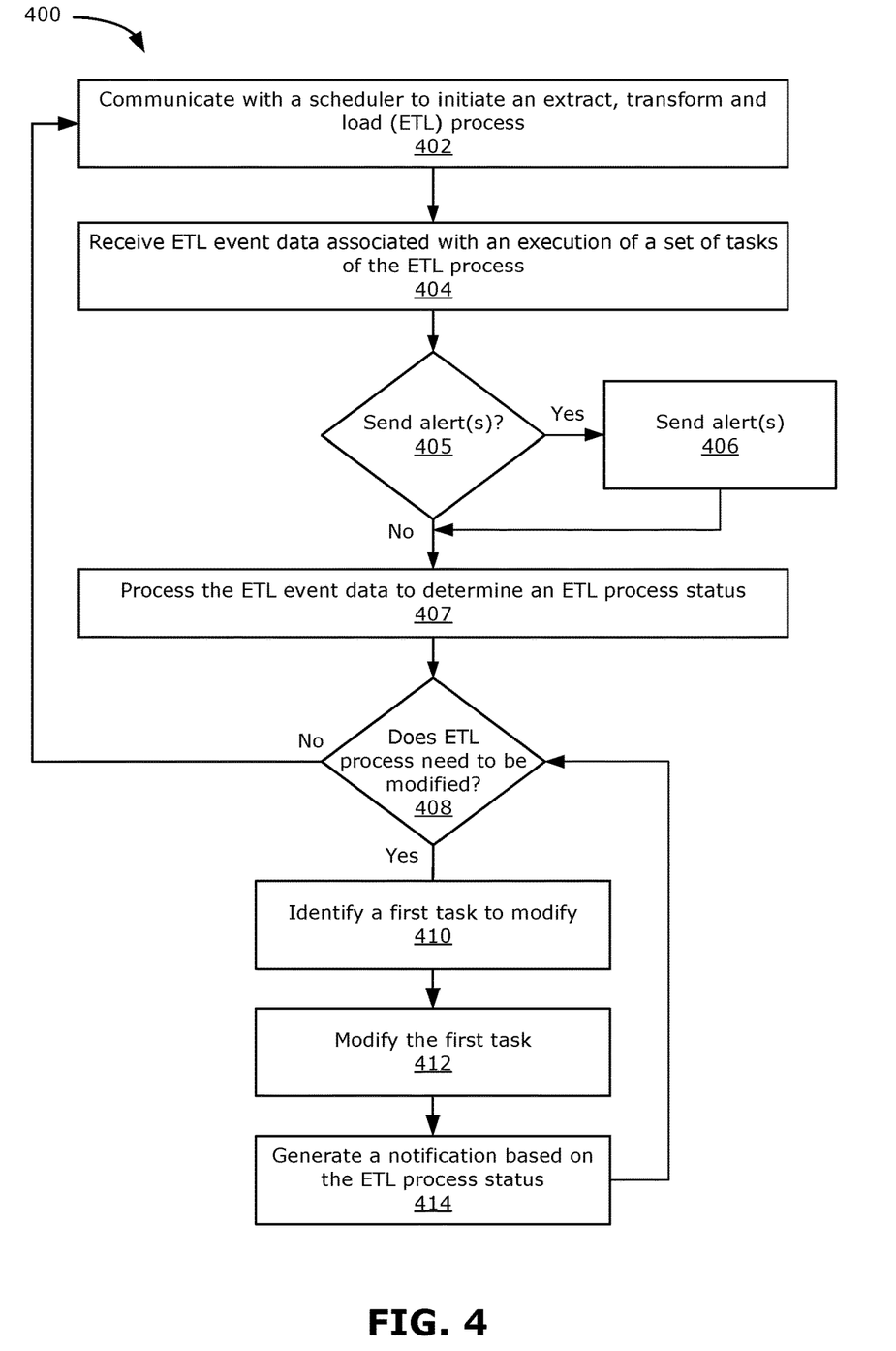
FIG. 4 is a flowchart illustrating a method for operation of an ETL system, in accordance with example embodiments of the present disclosure.

FIG. 4 is a flowchart of an exemplary method 400 for operation of an ETL management platform 300, in accordance with examples of the present disclosure. The method 400 may be performed by the computing system 200. For example, a processing unit of a computing system (e.g., the processor 202 of the computing system 200 of FIG. 2) may execute machine-executable instructions (e.g., instructions of the ETL management platform 300) to cause the computing system to carry out the example method 400. The method 400 may, for example, be implemented by an online platform or a server.

At an operation 402, an instruction may be communicated to scheduler 132 for initiating an ETL process, the ETL process including the execution of a set of scheduled tasks, for example, in a distributed computing environment (e.g., cloud computing environment 130).

At an operation 404, ETL event data 320 associated with the execution of the set of tasks of the ETL process may be received. In examples, the ETL event data 320 may include an executions log and/or connection status information, among other data associated with a status of the ETL process or an operating condition of the ETL process.

At 405, it is determined if one or more alerts (e.g., notifications 345) should be sent. If it is determined that one or more alerts should be sent at 405, the alert or alerts are sent at 406. For example, the alert may include a system alert, a text alert (e.g., a text message or SMS notification), an email alert, a phone alert, an alert delivered to another notification channel (e.g., a Slack™ notification), among others. In some embodiments, other notifications 345 may be configured, for example, to notify a user when a task has been completed, or terminated, or to notify another program of resource consumption, etc.

At an operation 407, the ETL event data 320 may be processed to determine an ETL process status or an operating condition of the ETL process. It is then determined at 408 if the ETL process needs to be modified. The ETL process status or operating condition may indicate that the ETL process status is acceptable, and no modifications to the ETL process are required. For example, if the ETL process does not require modification, the process may return to step 402. In some embodiments, the ETL process status may indicate an error in the ETL process, such as a connection failure, insufficient resources, or a deviation from an operating threshold, among other errors. If it is determined that an ETL process needs to be modified at 408, then a first relevant part of the ETL process to be modified is identified at 410.

At an operation 412, in response to identifying the relevant part of the ETL process for modification at 410, it is modified at 412. For example, the relevant part of the ETL process may be associated with a hardware configuration for executing a first task of the ETL process, and the hardware configuration may be modified, for example, by adjusting and/or adding resources for executing the first task. Additionally, or alternatively, the relevant part of the ETL process may be associated with a first task of the ETL process, and the first task may be modified. In an embodiment, the ETL task code (e.g., task instructions) may be analyzed for correctness, and in response to determining that the ETL task code is incorrect, replacement code or modified code associated with the first task may be provided to correct the error.

At an operation 414, a notification 345 may be generated for notifying a user of the error in the ETL process and/or the correction taken. In examples, the notification 345 may include a system alert, a text alert (e.g., a text message or SMS notification), or an email alert, among others. Upon sending the notification at 414, the method 400 can return to 408, at which it is determined if the ETL process still needs to be modified. For example, in response to determining that an ETL process involving an SQL query is exceeding available resources and causing the process to slow down more than desired, a task of the ETL process may be modified to process the data in smaller batches, or to change the way the query is built, among other adjustments.

Figure 5:
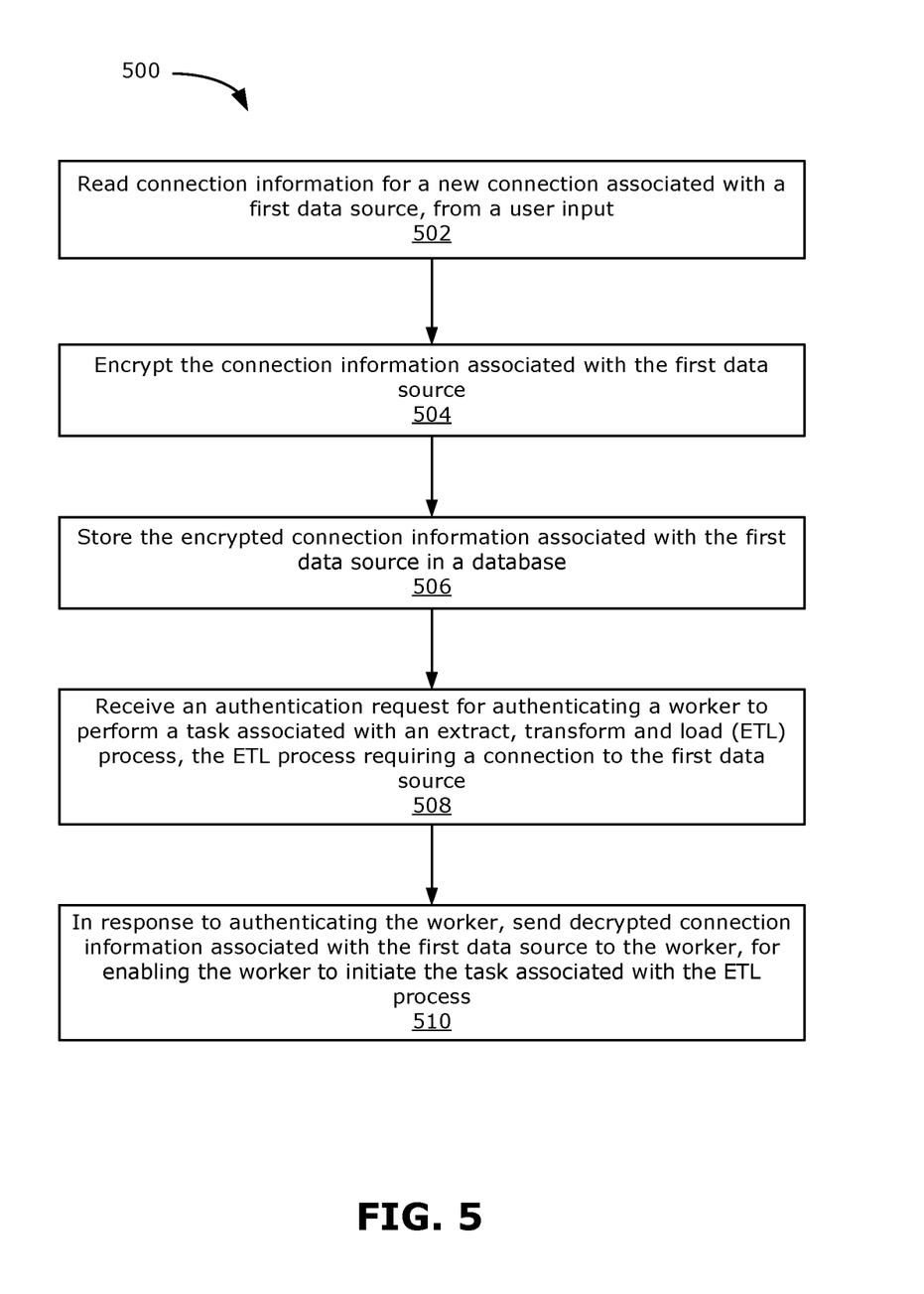
FIG. 5 is a flowchart illustrating a method for creating an encrypted connection in accordance with exemplary embodiments of the present disclosure

FIG. 5 is a flowchart of an example method 500 for creating an encrypted connection in accordance with exemplary embodiments of the present disclosure. The method 500 may be performed by the computing system 200. For example, a processing unit of a computing system (e.g., the processor 202 of the computing system 200 of FIG. 2) may execute machine-executable instructions (e.g., instructions of the ETL management platform 300) to cause the computing system to carry out the example method 500. The method 500 may, for example, be implemented by an online platform or a server.

At an operation 502, connection information for a new connection, for example, to a first data source of the one or more data sources 150 or to a data warehouse 140, may be read from a user input.

At an operation 504, the connection information associated with the first data source or the data warehouse 140 may be encrypted.

At an operation 506, the encrypted connection information associated with the first data source may be stored in a database, for example, connections database 142.

At an operation 508, an authentication request 305 may be received from a worker 136 of a distributed computing environment (e.g., cloud computing environment 130) for authenticating the worker 136 to perform a task associated with an ETL process, the task requiring a connection to the first data source or the data warehouse 140. For example, the authentication request may include information required to authenticate the worker 136, such as a key or token etc.

At an operation 510, in response to authenticating the worker 136, the encrypted connection information associated with the first data source or the data warehouse 140 may be retrieved from the connections database 142 and decrypted. The decrypted connection information associated with the first data source or the data warehouse 140 may be sent to the worker 136, for example, for enabling the worker 136 to initiate the task associated with the ETL process. In this regard, only those workers 136 that are authorized for the connection to the first data source or to the data warehouse 140 are able to establish the connection and complete the task, thereby maintaining the integrity and improving the quality of data associated with the ETL process.

Figure 6A:
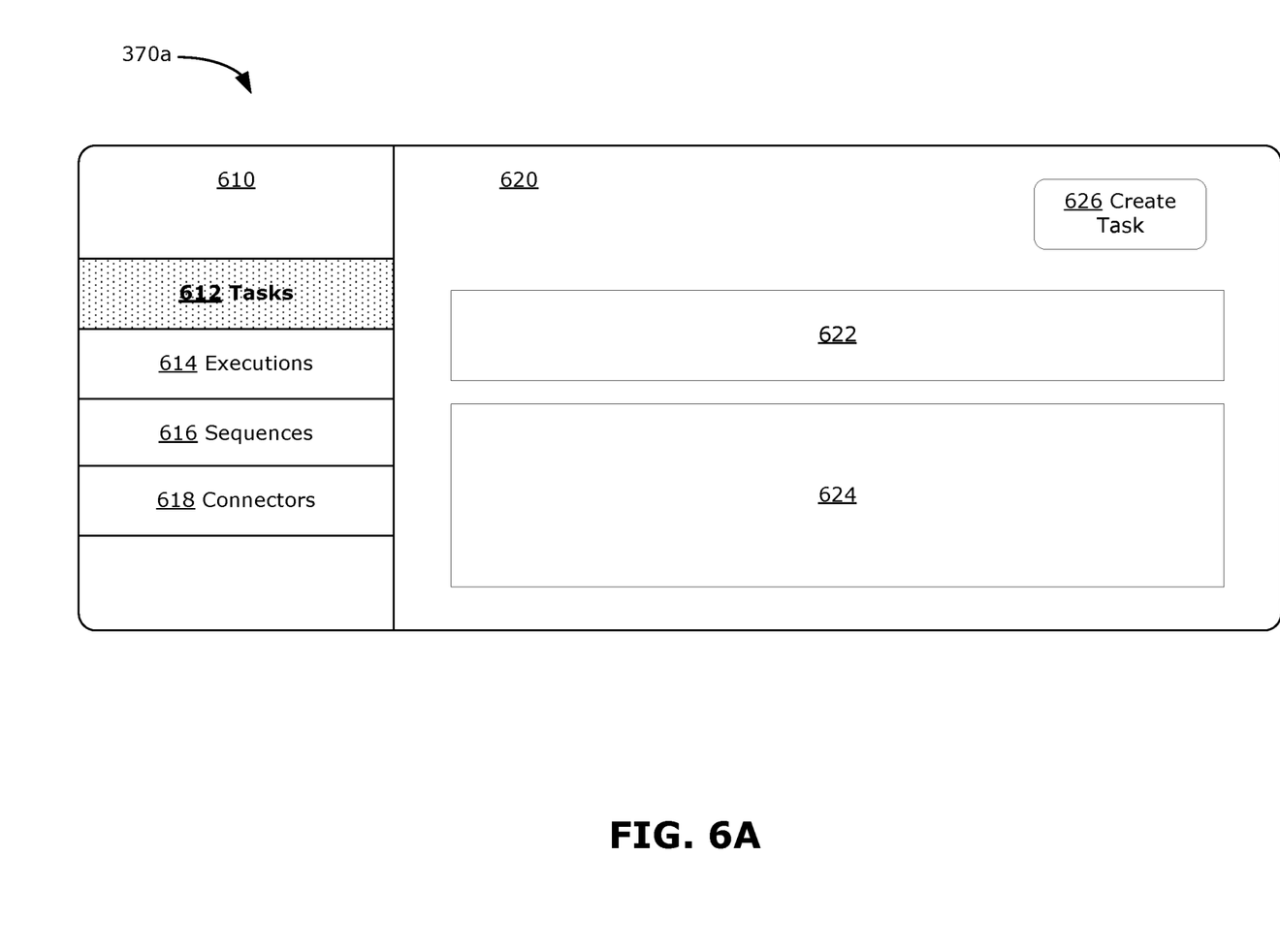
FIGS. 6A-C illustrate a simplified example user interface showing operation of an example ETL management platform, in accordance with examples of the present disclosure.
Figure 6B:
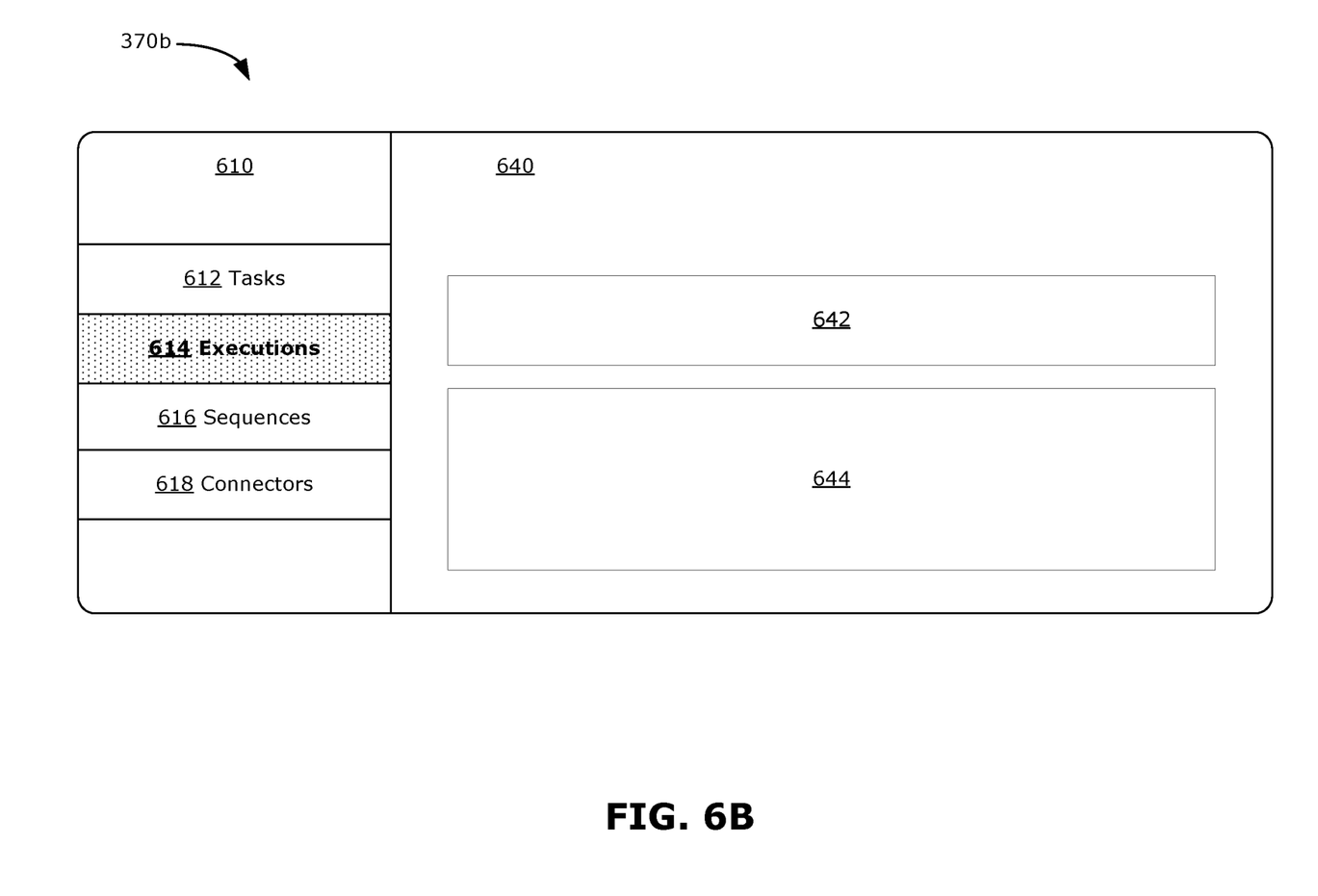
Figure 6C:
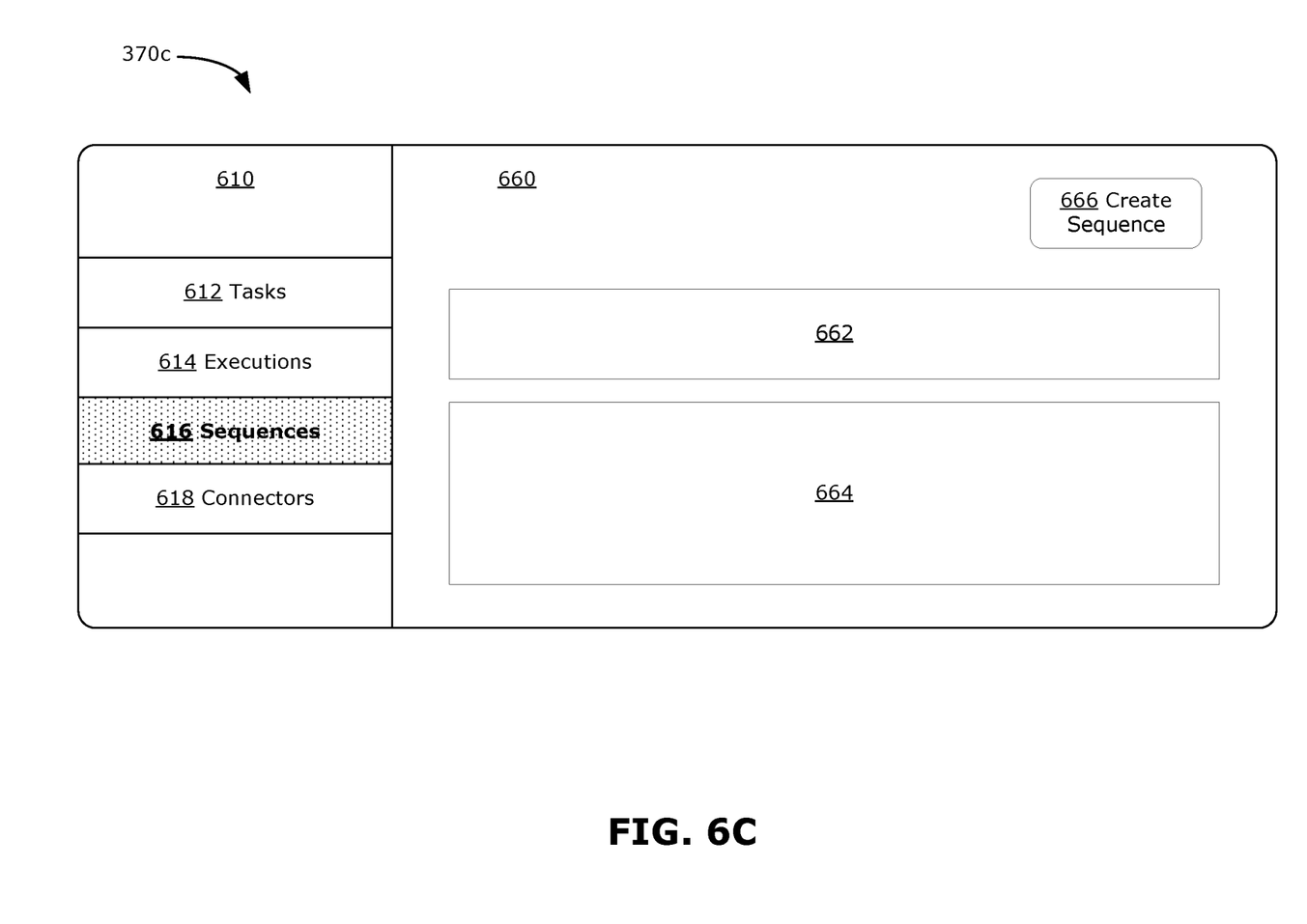

FIGS. 6A-C illustrate examples of a simplified user interface (e.g., dashboard 370), which may be implemented by an example of the ETL management platform 300 as disclosed herein (e.g., using the UI module 360). It should be understood that the examples are for illustrative purposes only and are not intended to be limiting.

In the examples of FIG. 6A-C, a menu 610 of the dashboard 370 provides a plurality of options associated with elements of the ETL system 250, for example, tasks 612, executions 614, sequences 616, connectors 618, among others. In examples, the selection of an option from the menu 610 by a user, for example, while interacting with the dashboard 370, may cause a corresponding page to be loaded within the dashboard 370, for example, a task page 620, an executions page 640, a sequences page 660, among others.

In the example of FIG. 6A, dashboard 370a including task page 620 is presented to the user. The task page 620 may include an identification block 622, for example, for identifying a project associated with the ETL system 250, or for searching or filtering task records based on task name, task status, etc. The task page 620 may also include a record block 624, for example, for displaying a record of tasks which may be new or scheduled, running, failed, skipped, completed etc. within the ETL system 250, including various metrics for each task. In some embodiments, a user may instruct the execution of a task in the record block 624, among other interactions. In some embodiments, a new task may be created that may be associated with a particular project or ETL pipeline, for example, using a create task button 626.

In the example of FIG. 6B, dashboard 370b including execution page 640 is presented to the user. The execution page 640 may include an identification block 642, for example, for identifying a project associated with the ETL system 250, or for searching or filtering execution records based on execution name, execution status, date range etc. The execution page 640 may also include a record block 644, for example, for displaying a record of executions which may be new or scheduled, running, failed, skipped, completed etc. within the ETL system 250, including various metrics associated with each execution. In some embodiments, a user may instruct the ending of a task associated with an execution in the execution record (e.g., kill a task) within the record block 644, among other interactions.

In the example of FIG. 6C, dashboard 370c including sequences page 660 for managing groups of tasks as sequences, is presented to the user. The sequences page 660 may include an identification block 662, for example, for identifying a project associated with the ETL system 250, or for searching or filtering sequence records based on sequence name. The sequences page 660 may also include a record block 664, for example, for displaying a record of sequences within the ETL system 250, including various metrics associated with each sequence. In some embodiments, a user may instruct the enabling or disabling of a sequence in the record block 664, or the execution of a sequence in the record block 664, among other interactions. In some embodiments, a new sequence may be created that may be associated with a particular project or ETL pipeline, for example, using a create sequence button 646.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable an electronic device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computing system for managing an extract, transform and load (ETL) process comprising:
one or more processors; and
a memory in communication with the one or more processors, the memory storing machine-executable instructions which, when executed by the one or more processors, cause the one or more processors to:
receive ETL event data associated with an execution of a set of ETL tasks of the ETL process;
process the ETL event data to identify a first ETL task of the set of ETL tasks limiting a performance of the ETL process, wherein the first ETL task corresponds to one or more SQL operations;
process the ETL event data to identify a resource limiting the performance of the ETL process, wherein the resource is memory, storage, processor bandwidth, or network bandwidth;
split the first ETL task into two or more subtasks; and
automatically modify a set of task instructions associated with the first ETL task to dynamically schedule the two or more subtasks as part of the ETL process to improve the performance of the ETL process.

2. The computing system of claim 1, wherein the machine-executable instructions, when executed by the one or more processors, cause the one or more processors to:
process the ETL event data to identify a resource limiting the performance of the ETL process, wherein the resource is memory, storage, processor bandwidth, or network bandwidth; and
automatically modify a hardware configuration employed for running one or more ETL tasks of the set of ETL tasks to increase an allocation of the resource to improve the performance of the ETL process.

3. The computing system of claim 1, wherein the machine-executable instructions, when executed by the one or more processors, cause the one or more processors to:
in response to identifying the first ETL task is limiting the performance of the ETL process as a result of an error, obtain a database schema and a natural language representation of a user intent associated with the first ETL task; and
automatically modify, using a generative machine learning model, the set of task instructions associated with the first ETL task, based on the database schema and the natural language representation.

4. The computing system of claim 3, wherein the set of task instructions represent SQL code associated with the one or more SQL operations.

5. The computing system of claim 1, wherein the machine-executable instructions, when executed by the one or more processors, cause the one or more processors to:
prior to receiving the ETL event data:
receive a natural language description of a requirement of the ETL process; and
generate, by a generative machine learning model, instructions for the set of ETL tasks of the ETL process, based on the natural language description.

6. The computing system of claim 1, wherein the machine-executable instructions, when executed by the one or more processors, cause the one or more processors to:
in response to identifying the first ETL task limiting the performance of the ETL process, determine whether one or more alerts should be sent; and
in response to determining that one or more alerts should be sent, generate the one or more alerts for notifying a user of a first operating condition of the ETL process.

7. The computing system of claim 6, wherein the one or more alerts is selected from the group consisting of:
a system alert;
a text alert;
an email alert;
a phone alert; and
a notification channel alert.

8. The computing system of claim 1, wherein the ETL event data comprises at least one of:
an execution log associated with an execution of the set of task instructions associated with the first ETL task; or
a connection data status for a connection associated with the first ETL task.

9. The computing system of claim 8, wherein the ETL event data enabling identification of the first ETL task limiting the performance of the ETL process comprises at least one of:
an error associated with an allocation of a first subset of computing resources on a computing system that are insufficient to perform the first ETL task;

an error in the set of task instructions associated with the first ETL task; or a failed connection to a data source associated with the first ETL task.

10. A method for managing an extract, transform, and load (ETL) process comprising:

receiving ETL event data associated with an execution of a set of ETL tasks of the ETL process;

processing the ETL event data to identify a first ETL task of the set of ETL tasks limiting a performance of the ETL process, wherein the first ETL task corresponds to one or more SQL operations;

processing the ETL event data to identify a resource limiting the performance of the ETL process, wherein the resource is memory, storage, processor bandwidth, or network bandwidth;

splitting the first ETL task into two or more subtasks; and automatically modifying a set of task instructions associated with the first ETL task to dynamically schedule the two or more subtasks as part of the ETL process to improve the performance of the ETL process.

11. The method of claim 10, further comprising:

processing the ETL event data to identify a resource limiting the performance of the ETL process, wherein the resource is memory, storage, processor bandwidth, or network bandwidth; and in response to determining that the ETL process is associated with an allocation of a first subset of computing resources on a computing system that are insufficient to execute one or more ETL tasks of the set of ETL tasks, automatically modifying a hardware configuration employed for running the one or more ETL tasks of the set of ETL tasks to increase an allocation of the resource to improve the performance of the ETL process.

12. The method of claim 10, further comprising:

in response to identifying the first ETL task is limiting the performance of the ETL process as a result of an error, obtaining a database schema and a natural language representation of a user intent associated with the first ETL task; and automatically modifying, using a generative machine learning model, the set of task instructions associated with the first ETL task, based on the database schema and the natural language representation.

13. The method of claim 12, wherein the set of task instructions represent SQL code associated with the one or more SQL operations.

14. The method of claim 10, further comprising:

prior to receiving the ETL event data:

receiving a natural language description of a requirement of the ETL process; and generating, by a generative machine learning model, instructions for the set of ETL tasks of the ETL process, based on the natural language description.

15. The method of claim 10, further comprising:

in response to identifying the first ETL task limiting the performance of the ETL process, determining whether one or more alerts should be sent; and in response to determining that one or more alerts should be sent, generating the one or more alerts for notifying a user of a first operating condition of the ETL process.

16. The method of claim 15, wherein the one or more alerts is selected from the group consisting of:

a system alert;

a text alert;

an email alert;

a phone alert; and a notification channel alert.

17. The method of claim 10, wherein the ETL event data comprises at least one of:

an execution log associated with an execution of the set of task instructions associated with the first ETL task; or a connection data status for a connection associated with the first ETL task.

18. The method of claim 17, wherein the ETL event data enabling identification of the first ETL task limiting the performance of the ETL process comprises at least one of:

an error associated with an allocation of a first subset of computing resources on a computing system that are insufficient to execute the first ETL task;

an error in the set of task instructions associated with the first ETL task; or a failed connection to a data source associated with the first ETL task.

19. A non-transitory computer-readable medium storing machine-executable instructions which, when executed by one or more processors, cause the one or more processors to:

receive ETL event data associated with an execution of a set of ETL tasks of the ETL process;

process the ETL event data to identify a first ETL task of the set of ETL tasks limiting a performance of the ETL process, wherein the first ETL task corresponds to one or more SQL operations; process the ETL event data to identify a resource limiting the performance of the ETL process, wherein the resource is memory, storage, processor bandwidth, or network bandwidth;

split the first ETL task into two or more subtasks; and automatically modify a set of task instructions associated with the first ETL task to dynamically schedule the two or more subtasks as part of the ETL process to improve the performance of the ETL process.

* * * * *